(12) United States Patent
Hagen et al.

(10) Patent No.: US 7,367,352 B2
(45) Date of Patent: May 6, 2008

(54) MULTIWAY VALVE ARRANGEMENT

(75) Inventors: Harald Hagen, Wipper-fürth (DE);
Markus Hasberg, Wipperfuerth (DE);
Andreas Suhr, Cologne (DE)

(73) Assignee: Voss Automotive GmbH, Wipperfurth (DE)

( * ) Notice: Subject to any disclaimer, the term of this patent is extended or adjusted under 35 U.S.C. 154(b) by 108 days.

(21) Appl. No.: 11/232,046

(22) Filed: Sep. 21, 2005

(65) Prior Publication Data

US 2006/0185734 A1    Aug. 24, 2006

Related U.S. Application Data

(60) Provisional application No. 60/655,200, filed on Feb. 22, 2005.

(51) Int. Cl.
*F16K 11/00* (2006.01)
*F02M 37/00* (2006.01)
*F02B 15/00* (2006.01)

(52) U.S. Cl. ............ 137/255; 137/595; 137/597; 137/599.03; 123/514; 123/575; 180/314

(58) Field of Classification Search .......... 137/599.03, 137/255, 597, 595; 123/514, 575–578; 180/314; 285/62, 124.1, 133.11
See application file for complete search history.

(56) References Cited

U.S. PATENT DOCUMENTS

| | | | | |
|---|---|---|---|---|
| 2,414,451 A | * | 1/1947 | Christensen | 137/255 |
| 2,584,890 A | * | 2/1952 | Leonard | 187/7.4 |
| 2,675,024 A | * | 4/1954 | Clark | 137/625.68 |
| 3,288,238 A | * | 11/1966 | Lindsey | 180/314 |
| 3,809,361 A | * | 5/1974 | Pfundstein et al. | 251/305 |
| 3,988,787 A | * | 11/1976 | Colee | 4/489 |
| 4,287,908 A | * | 9/1981 | Storgard | 137/255 |
| 4,860,785 A | * | 8/1989 | Sundstrom, Jr. | 137/351 |
| 5,323,808 A | * | 6/1994 | Shimizu | 137/594 |
| 5,653,421 A | * | 8/1997 | Ellzey | 251/129.1 |
| 5,960,809 A | * | 10/1999 | Keller | 137/12 |
| 6,213,243 B1 | * | 4/2001 | Studebaker et al. | 180/314 |
| 6,394,217 B2 | * | 5/2002 | Studebaker | 180/314 |
| 6,763,791 B2 | * | 7/2004 | Gardner et al. | 123/90.17 |
| 7,121,266 B2 | * | 10/2006 | Powell | 123/509 |
| 2005/0077100 A1 | * | 4/2005 | Hasegawa | 180/426 |

FOREIGN PATENT DOCUMENTS

DE    10 2006 008 524 A1 *  8/2006
DE    10 2006 027 083 A1 * 12/2006

* cited by examiner

*Primary Examiner*—Stephen K. Cronin
*Assistant Examiner*—Ka Chun Leung
(74) *Attorney, Agent, or Firm*—Brinks Hofer Gilson & Lione (57) ABSTRACT

The valve device consists, according to the invention, of (at least) two part valves which are symmetrical in circuit terms with respect to the existing connections and which are designed, in particular, as four-way, two position valves of any desired type of construction, but preferably are provided as slide valves. There is preferably a double slide valve with two cooperating slide valves. The valve device features internal seals and sealing surfaces which minimize wear and damage to the seals as they move across flow ports. The valve device is particularly adapted for use as a fuel control valve for an internal combustion powered motor vehicle having two separate fuel tanks. The valve device permits control over which tank supplies fuel to the engine, and allows controlled mixing of the fuels from each tank.

28 Claims, 7 Drawing Sheets

MULTIWAY VALVE ARRANGEMENT

CROSS REFERENCE TO RELATED APPLICATION

This application claims priority to U.S. provisional patent application Ser. No. 60/655,200, filed Feb. 22, 2005.

FIELD OF THE INVENTION

The present invention relates to a multiway valve arrangement for use as a fuel tank changeover valve between two fuel tanks of a motor vehicle, with two connections for each tank having forward flow and return flow lines. The valve device of this invention enables the forward flow tank connections to be connected alternatively or jointly to the engine and the return flow tank connections can be connected alternatively or jointly to the return flow engine connections.

BACKGROUND OF THE INVENTION

In certain regions of the earth, for example in the U.S.A., long distances between zones with high average temperatures and zones with very low temperatures are covered by heavy duty motor trucks in intercity transport. Since heavy duty motor trucks are usually operated with diesel fuel, there is a problem that "normal diesel" fuel freezes at about −15° C. At lower temperatures, therefore, diesel powered vehicles have to be operated with another special fuel, what is known as "Arctic diesel", which still remains liquid even at temperatures down to −40° C. However, Arctic diesel is approximately 10% to 15% more costly than normal diesel and, moreover, also gives rise to a fuel consumption which is about 10% to 15% higher. The aim, therefore, is to avoid operating the vehicle with Arctic diesel only, that is to say even in warmer regions. It is nevertheless impracticable and also not viable to change over the entire fuel system with tank or tanks and lines in the event of a change between warm and cold regions, that is to say to empty the tanks and refill them completely.

Heavy motor trucks are nowadays usually equipped with (at least) two fuel tanks. There is always the possibility, depending on the application, of filling the tanks with an identical or different types of fuel. With the aid of a valve arrangement of the type described in the introduction, the tanks can then be connected individually or jointly to the engine.

A known valve arrangement of the generic type mentioned is produced as a multivalve from metal and consists of a large number of individual parts screwed to one another, specifically of four 2/2-way valves (i.e. two-position two flow path valves) which are connected via two T-distributors. Each individual valve is designed as a ball valve and is operated mechanically via pull/push rods. This gives rise to some significant disadvantages:

- long actuation travels of the lever mechanisms (150 to 160 mm)
- high weight (approximately 2.5 kg)
- screwed connections are not directionally adjustable or are directionally adjustable only with difficulty (with regard to the direction of run of connected lines)
- high costs in terms of material and of assembly
- high actuation force
- only direct manual actuation possible, for which purpose the driver has to stop the vehicle and leave the driver's cab.

The object on which the present invention is based is to provide a motorway valve arrangement of the type mentioned which is improved in order to avoid the disadvantages described and which is distinguished, in particular, by a reduced outlay in terms of material and of assembly, by low weight and by a low actuation force, along with the resulting possibility of automatic (remote) actuation.

SUMMARY OF THE INVENTION

The valve device consists, according to the invention, of (at least) two part valves which are symmetrical in circuit terms with respect to the existing connections and which are designed, in particular, as 4/2-way valves (i.e. four ports and four possible flow paths and two valve positions) of any desired type of construction, but preferably are provided as slide valves. There is preferably a double slide valve with two cooperating slide valves. This constitutes a cost-effective solution which fulfills all the functions of the known valve arrangement at minimal outlay, but in this case consists of very few individual components. This also results in a low outlay in terms of production and of assembly. The use of slide valves is also highly advantageous with regard to the throughflow properties, because large flow cross sections can be implemented. Thus, there does not have to be a flow around any seals, so that the flow cross sections within the valve arrangement can be even about 20% larger than in the connected lines, even without larger installation dimensioning of the valve arrangement. The switching travels necessary for actuation can be kept lower than 30 mm.

The actuation forces are so low in the valve arrangement of this invention that even switching by automatic means, in particular electromagnetically or pneumatically, is possible. Moreover, as compared with the known version, a weight reduction of at least 50% (in the case of manual actuation) or of at least 20% (in the case of automatic actuation) can be achieved. Finally, all the connections can be designed to be directionally adjustable in a very simple way, in particular owing to the use of plug connections.

Each part valve of the valve arrangement of this invention has two tank connections for forward flow and return flow and two engine connections for forward flow and return flow, the forward flow engine connections of the valves being connected to one another to form a common forward flow engine connection, and the return flow engine connections of the valves being connected to one another to form a common return flow engine connection.

It may be noted, at this juncture, that the preferred double slide valve may, in principle, also be used independently of the special application, specifically as a 6/3-way or 6/4-way valve.

BRIEF DESCRIPTION OF THE DRAWINGS

The invention will be explained in more detail by means of preferred exemplary embodiments illustrated in the drawing in which.

DETAILED DESCRIPTION OF THE INVENTION

Identical parts are always given the same reference symbols in the various figures in the drawing.

Figure 23:
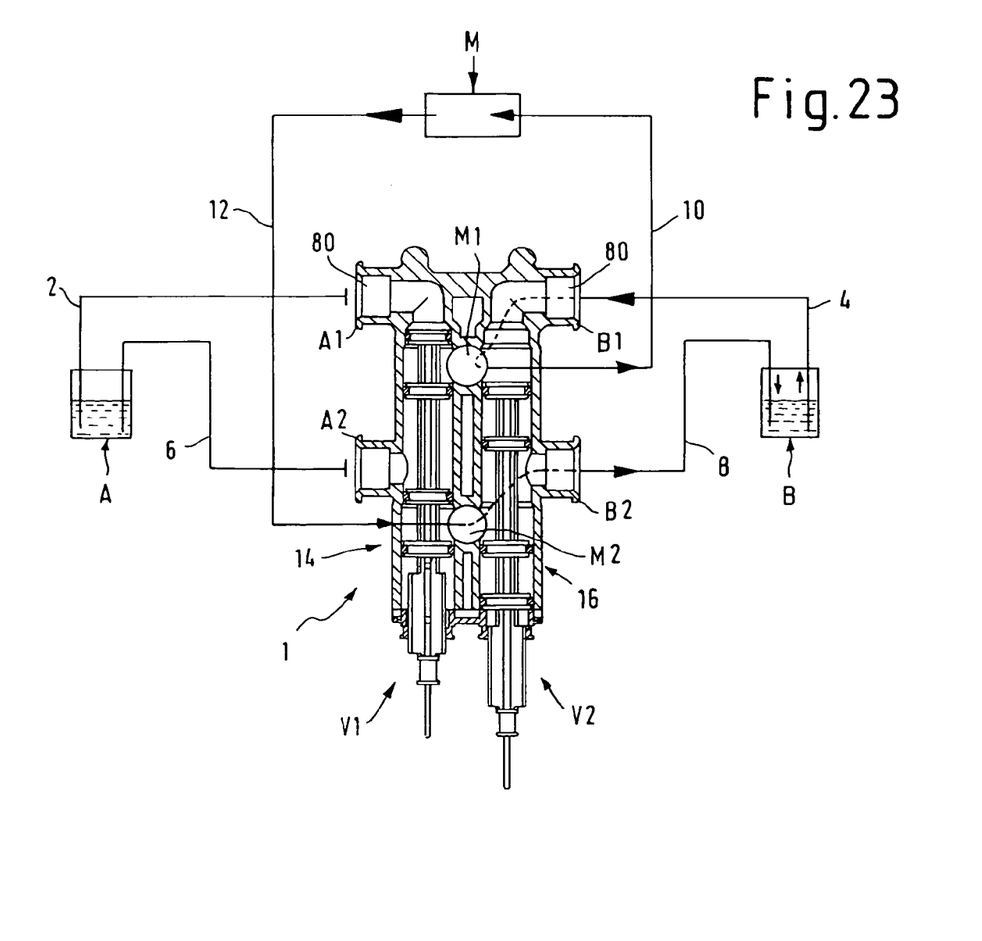
FIG. 23 shows a simplified circuit diagram of the valve arrangement according to the invention as the changeover valve between two fuel tanks and an engine, for example in a switching position such as that in FIG. 13.

As first becomes apparent from FIG. 23, a multiway valve arrangement 1 according to the invention is used, in particular, as a fuel tank changeover valve between two fuel tanks A and B and an engine M, only indicated diagrammatically, in a motor vehicle (motor truck). For this purpose, the valve arrangement 1 has tank connections A1, A2 for the tank A and tank connections B1, B2 for the tank B, the connections A1 and B1 functioning as forward flow tank connections in each case for a tank suction line 2, 4 leading respectively from the tank A and B to the valve arrangement 1, and the connections A2 and B2 functioning as return flow tank connections in each case for a return line 6 and 8 leading back respectively in the direction of the tank A and B. Furthermore, the valve arrangement 1 has two engine connections M1 and M2, the connection M1 being provided as a forward flow engine connection for a forward flow line 10 leading to the engine M, and the connection M2 being provided as a return flow engine connection for a return flow line 12 coming from the engine M. The valve arrangement 1 has, furthermore, a valve device such that the forward flow tank connections A1, B1 can be connected alternatively or jointly to the forward flow engine connection M1 and the return flow tank connections A2, B2 can be connected alternatively or jointly to the return flow engine connection M2. As a result, alternatively, either the tank A or the tank B can be connected to the engine, or both tanks A and B can be connected in parallel to the engine. A fourth switching position is preferably also provided, in which both tanks A and B are separated, that is to say shut off, from the engine M. The switching position is illustrated by way of example in FIG. 23, the tank B being connected to the engine M, while the other tank A is shut off. As regards the other switching positions, reference is made, at this early stage, to FIG. 10 to 13.

According to the invention, then, the valve device 1 consists of two cooperating multiway part valves V1, V2, in particular slide valves 14 and 16. Each part valve V1, V2 or slide valve 14, 16 is designed as a 4/2-way valve and has two of the tank connections, specifically A1 and A2, on the one hand, and B1 and B2, on the other hand, for forward and return flow. The term "four-way" valve is used herein to refer to a valve having four ports and four possible flow paths. Slide valves 14 and 16 are also designated as 4/2-way valves, meaning they are four way valves with two switching positions. The engine connections M1, M2 are connected to both slide valves 14, 16. This results, overall, in a construction as a 6/3-way or 6/4-way valve in six connections (and flow paths) and at least three and preferably four, switching positions.

Figure 8:
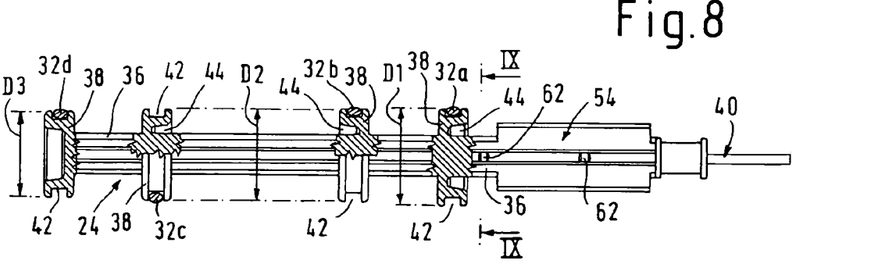
FIG. 8 shows a partially sectional side view of an individual part, specifically of a slide, of the valve arrangement according to the invention.
Figure 9:
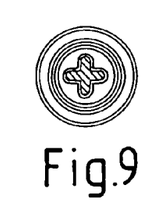
FIG. 9 shows a cross section in the plane IX-IX according to FIG. 8, FIGS. 10-13 show illustrations similar to FIG. 3 in various switching positions of the valve arrangement according to the invention.

Each slide valve 14, 16 has a valve housing 18 and a slide 24 longitudinally displaceable in a piston-like manner between (at least) two switching positions in an elongate cylinder-like slide space 20 within the valve housing 18 in the direction of a slide axis 22 (cf., in this respect, also a separate illustration in FIG. 8). Although two positions are described, a mid-travel or neutral position may also be used. Each slide space 20 has, at points offset axially, that is to say in the direction of the slide axis 22, four control ports 26 which are connected in each case to one of the tank connections A1, A2 or B1, B2 or to one of the engine connections M1 or M2. Depending on the position of the slides 24, the control ports 26 can be connected in pairs or can be shut off relative to one another.

In the preferred version, two slide valves 14, 16 are arranged directly adjacently to one another and, with respect to their slide axes 22, parallel to one another. In a further advantageous refinement, the two valve housings 18 are in this case combined to form a monolithically one-piece housing molding 28. This molding 28 is produced, in particular, as a plastic injection molding or as a diecasting, for example from aluminum or zinc. This also contributes to economical production. In principle, however, the molding 28 may also be produced from solid materials by means of cutting machining.

The one-piece housing molding 28 with the two valve housings 18 is designed mirror-symmetrically with respect to a central plane of symmetry 30. Thus, the tank connections A1, A2 and B1, B2 extend in each case outward away from housings in a direction of run parallel (not shown) or perpendicular to the plane of symmetry. The engine connections M1, M2 are arranged centrally with a direction of run corresponding to the plane of symmetry 30. The engine connections M1, M2 therefore lie centrally between the two slide valves 14, 16. Each engine connection M1, M2 merges into a duct which intersects the slide spaces 20 of the two slide valves 14, 16 in order to form the associated control ports 26. The engine connections M1, M2 are thereby connected to the two slide valves 14 and 16 in a simple way.

Each slide 24 has, at points spaced apart axially, circumferential seals 32 which cooperate with inner sealing faces of the respective valve housing 18. In this case, see, in particular, FIG. 8, each slide 24 consists of a centric axial core 36 and of a plurality of, in the version illustrated four, radial dish-like valve disks 38 and also of an actuation end 40 led outward from the respective valve housing 18 on one side. Each valve disk 38, on its outer circumference, carries one of the circumferential seals 32, preferably in an annular groove 42. The circumferential seals 32 may be formed from elastic O-rings. According to FIG. 8, it is advantageous if the valve disks 38 have axial undercuts 44 in the region radially between the core 36 and the outer circumference. In the case of a preferred production of the slides 24 as one-piece plastic moldings, material accumulations and consequently distortion are advantageously avoided due to the undercuts 44. These undercuts 44 are removed from the mold, during manufacture, by means of what may be referred to as a jump core technique.

Figure 4:
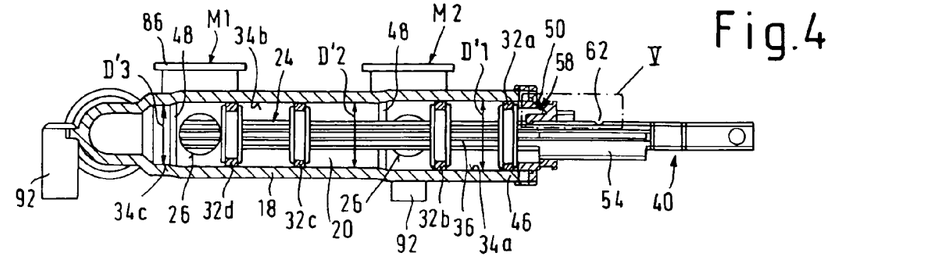
FIG. 4 shows a further axial section in the sectional plane IV-IV according to FIG. 3, the sectional plane being perpendicular to the view according to FIG. 3.

In a further advantageous refinement of the invention, there is in this case provision for the circumferential seals 32, as regards their outside diameters D1, D2, D3 (see, in this respect, FIG. 8) and the sealing faces 34, as regards their inside diameters D'1, D'2 and D'3 (see FIG. 4), to be designed in adaptation to one another in such a way that each circumferential seal 32, which, during a switching action, moves axially over and beyond the region of one of the control ports 26 (in the example illustrated, these are the seals 32b and 32d; see FIGS. 4 and 8), is essentially unpressed radially in its range of movement extending axially over and beyond the respective control ports 26 and is pressed radially only in a sealing region lying in each case axially between two control ports 26 to be separated from one another. What is avoided by means of this advantageous measure is that one of the circumferential seals 32 could be damaged during its movement over and beyond a control port 26 issuing laterally into the slide space 20, since, in a pressed state, the seal could expand into the control port 26 and, during further movement, catch at the port edge and thus be damaged. This is avoided by means of the measure according to the invention.

In the preferred version, there is provision for the slide space 20 of each valve housing 18 to have, starting from an end 46 open for the actuation end 40 of the slide 24, a plurality of essentially cylindrical sealing faces 34a to c which merge axially one into the other via conical transitions 48 and the inside diameters D'1 to D'3 of which are reduced successively via the conical transitions 48 (see FIG. 4 again). It may be noted that the sealing faces 34 may also in each case be designed to be slightly conical, that is to say with a small cone angle $\leq 1°$. This allows a simplified removability from the mold in the case of production as an injection molding or diecasting. The design of the diameters must in this case, of course, be such in relation to the associated circumferential seals that each circumferential seal 32 ensures reliable sealing off in its sealing position in the region of the associated sealing face 34. As regards the slide 24 (see FIG. 8), the circumferential seal 32a which is first, starting from the actuation end 40, has a diameter D1 which is adapted to the inside diameter D'1 of the first sealing face 34a in such a way that this circumferential seal 32a is pressed for sealing off. This first circumferential seal 32a consequently serves for constantly sealing off the slide space 20 outwardly in the direction of the open end 46. The next, second circumferential seal 32b has, in comparison, a reduced diameter D2, so that this second circumferential seal 32b is not or at least not completely pressed radially in the region of the first sealing face 34a. As a result, it can move harmlessly over and beyond the region of the first control port 26. Thereafter, this second circumferential seal 32b is pressed radially via the conical transition 48, until it then comes to bear sealingly on the second sealing face 34b having the inside diameter D'2. There is a similar behavior also with the third and the fourth circumferential seal 32. Thus, in each position, the third circumferential seal 32c is pressed radially and thereby bears sealingly against the sealing face 34b. Its diameter D2 accordingly corresponds approximately to the inside diameter D'2. The fourth and last circumferential seal 32d has a further-reduced diameter D3, so that it is consequently not or only insignificantly pressed radially in the region of this sealing face 34b having the inside diameter D'2. It can thereby move harmlessly over and beyond the region of the further control port 26 and is then pressed radially via the further conical transition 48, specifically according to the inside diameter D'3 of the following sealing face 34c.

Figures 20, 21:
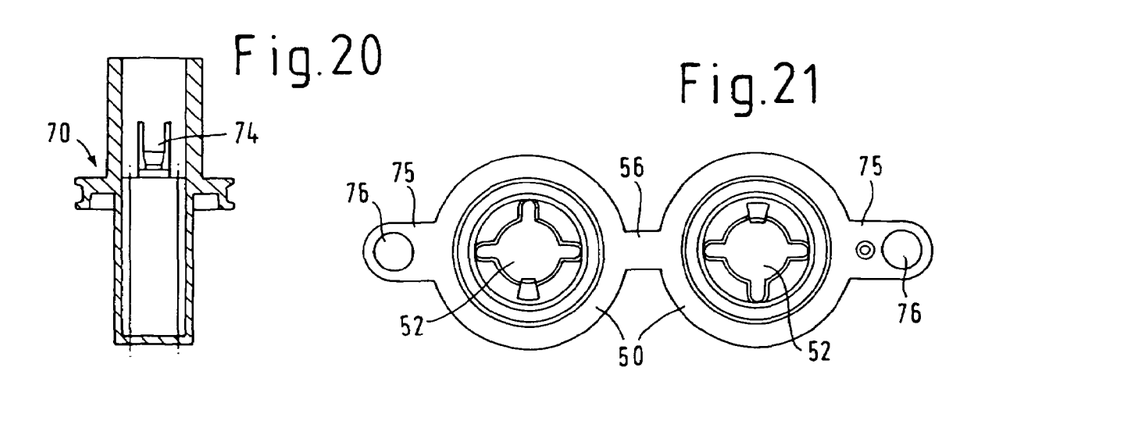
FIG. 20 shows a further axial section in the plane XX-XX in FIG. 18.
FIG. 21 shows a further view of a cover element in an alternative version to that of FIG. 6.

It is expedient if the valve housings 18 are closed or closable at their open ends 46 by means of a cover element 50. The cover element 50 preferably also serves for guiding the actuation end 40 of the respective slide 24. For this purpose, the cover element 50 has in each case a guide orifice 52 with an orifice contour corresponding to the cross section of the core 36 or of an additional guide portion 54. The example illustrated has a cross section deviating from the circular shape, in particular for example, a cruciform cross section, see, in particular, FIG. 6, so that guidance against rotation about the slide axis 22 is also achieved. By virtue of a special, in particular mutually "rotated" arrangement of the guide orifices 52 (cf. FIGS. 6 and 21), a defined installation position of the slides 24 for the correction of possible production-related dimensional deviations in the housing 18 is achieved. For this purpose, the slide 24 may be adapted in shape to the housing and its dimensional deviation. It is in this case advantageous, moreover, if the individual cover elements 50 of the two valve housings 18 are combined via a connection portion 56 to form a one-piece part, in particular a one-piece plastic molding.

Figure 5:
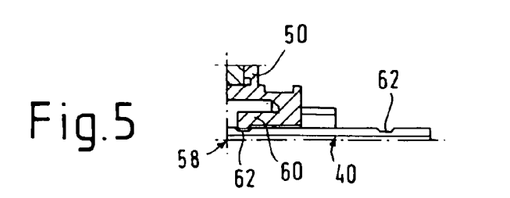
FIG. 5 shows, in the form of a detail, an enlargement of the region V in FIG. 4.

In a further preferred refinement, each slide 24 is fixed in each of two switching positions with a frictional form fit, in particular via latching means 58. As may be gathered particularly from FIG. 5, the latching means 58 provided may in each case be a latching arm 60 in the region of the guide orifice 52 of the cover element 50, the said latching arm engaging in each case with a latching nose into a latching recess 62 of the slide 24 or of the guide portion 54.

Figure 1:
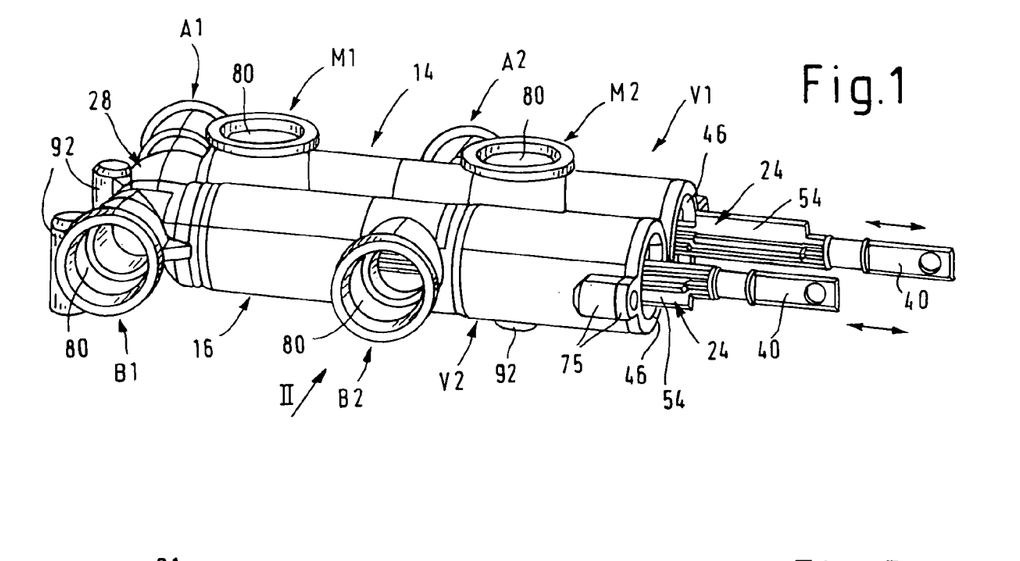
FIG. 1 shows a perspective view of a valve arrangement according to the invention, (without end-face cover elements)
Figure 2:
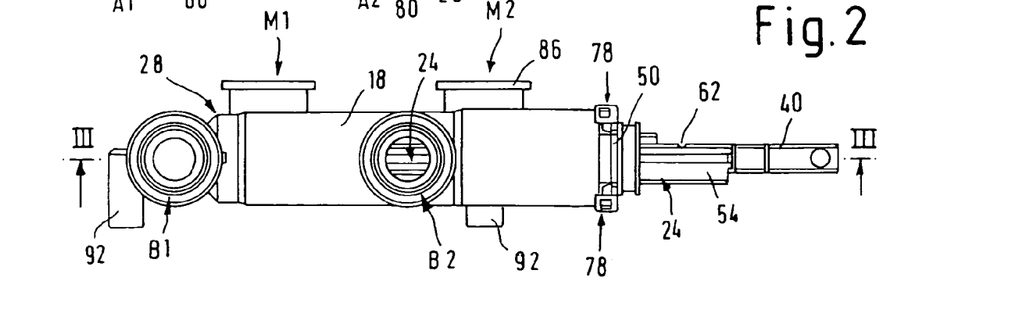
FIG. 2 shows a side view of the valve arrangement in the direction of the arrow II according to FIG. 1.
Figure 3:
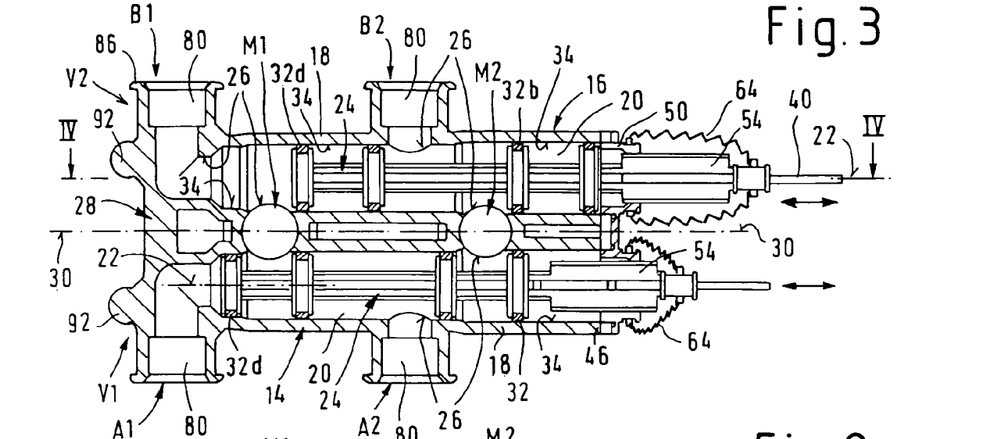
FIG. 3 shows an axial section in the plane III-III according to FIG. 2.

As indicated highly diagrammatically only in FIG. 3, it is advantageous, furthermore, if a sheath 64 variable in length in a concertina-like manner is arranged, for sealing off against dirt, between the actuation end 40 of each slide 24 and the valve housing 18 or the cover element 50 connected to the latter.

In the versions according to FIGS. 1 to 13, the slides 24 can be actuated manually, in particular via mechanical connections, not illustrated, such as linkages or cable pulls.

Alternatively, or even additionally, an actuation device 66 for the motive, in particular pneumatic or hydraulic or electromagnetic actuation of the slides 24 may be provided.

Figures 14, 16:
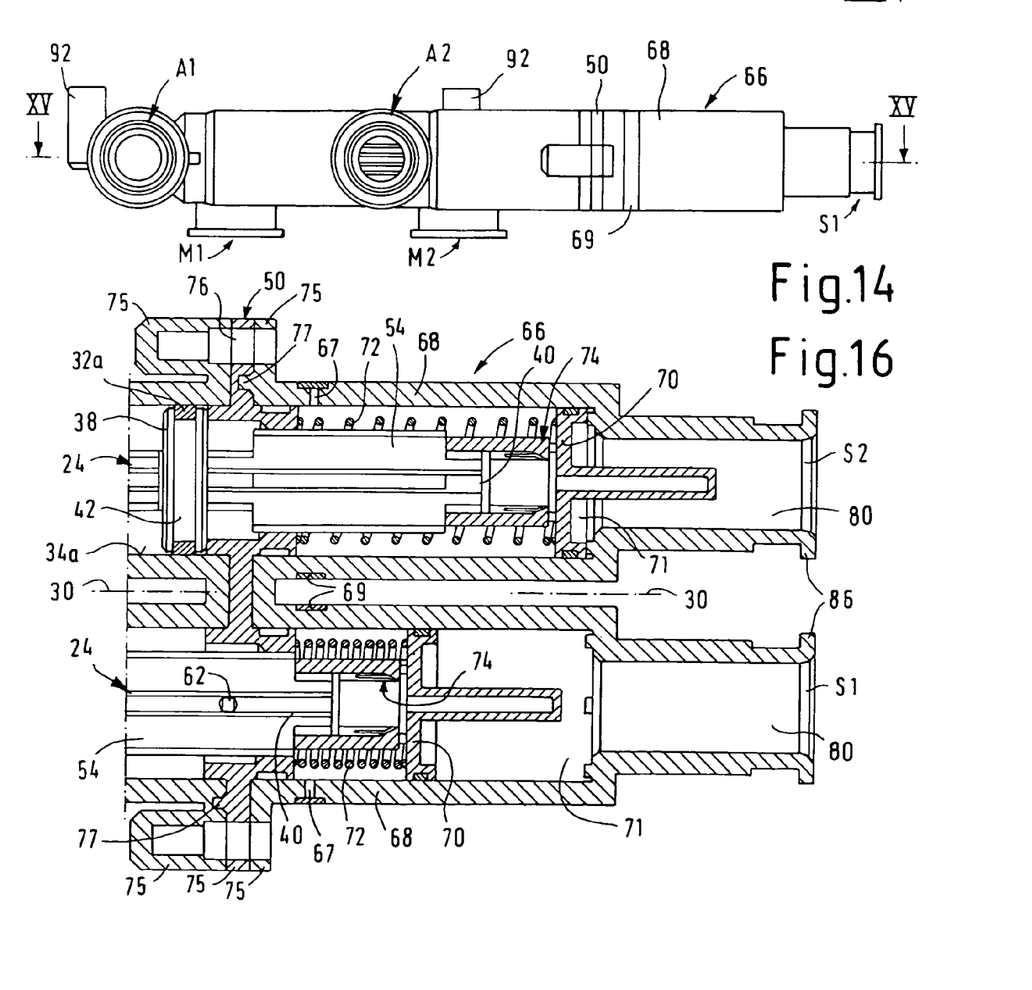
FIG. 14 shows a side view of the valve arrangement in an advantageous refinement with a pressure medium actuation device.
FIG. 16 shows an enlarged illustration of the region XVI of the actuation device in FIG. 15.
Figure 15:
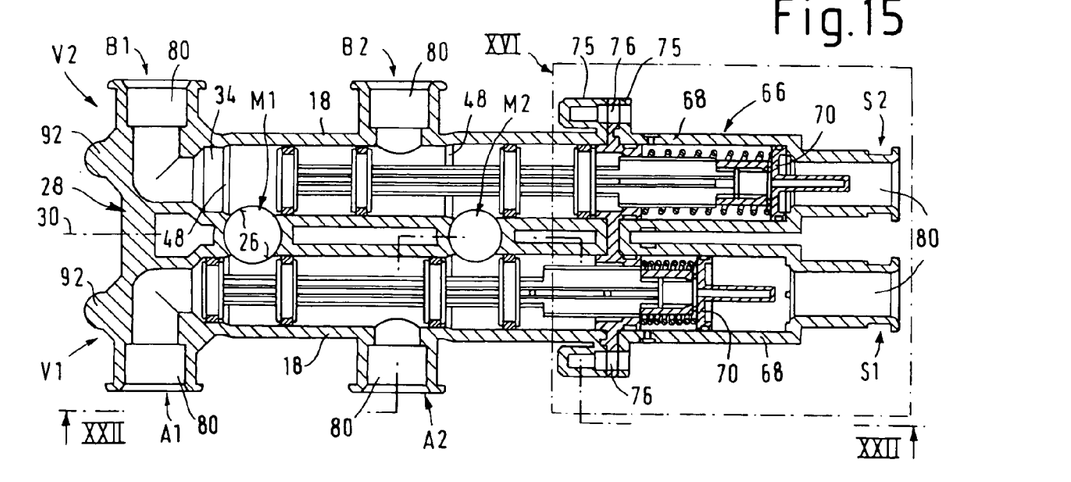
FIG. 15 shows an axial section in the plane XV-XV in FIG. 14.
Figure 17:
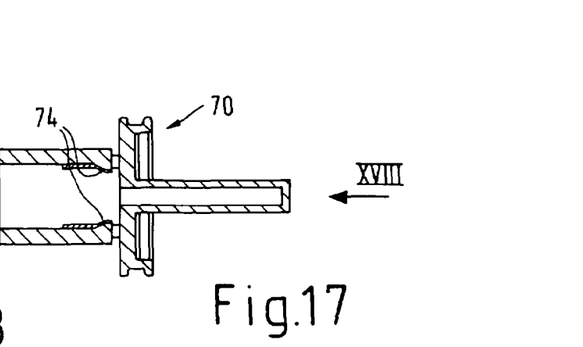
FIG. 17 shows an enlarged axial sectional view of an individual part, specifically of an actuation piston, of the actuation device according to FIG. 15 or 16.
Figure 18:
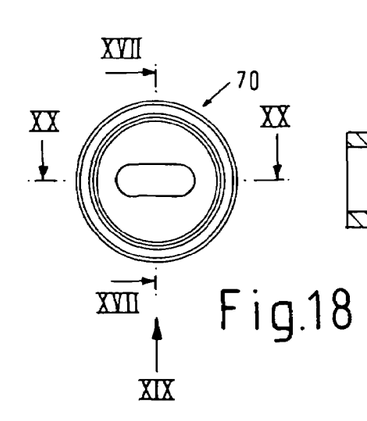
FIG. 18 shows an end view of the actuation piston in the direction of the arrow XVIII according to FIG. 17.
Figure 19:
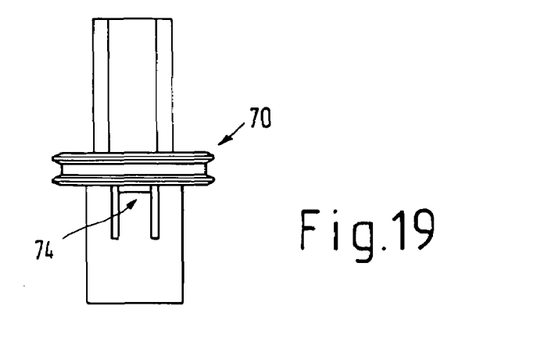
FIG. 19 shows a side view in the direction of the arrow XIX in FIG. 18.

For this purpose, reference is made to the exemplary embodiment according to FIGS. 14 to 16, in which the valve housings 18 are connected in each case to a cylinder housing 68 on the side of the actuation ends 40 of the slides 24, preferably additionally to the cover element 50. The slide actuation ends 40 are connected in each case to an actuation piston 70 guided in the cylinder housing 68. Each cylinder housing 68 has a control pressure connection S1 and S2. The respective actuation piston 70 can thereby be acted upon with a pressure medium on the side of a working space 71, in order to displace the associated slide 24, in particular, counter to the restoring force of a restoring spring 72. Preferably, in this case, each actuation piston 70 is connected to the actuation end 40 of the associated slide 24 via latching means 74. In this respect, reference is also made to the separate illustrations of the actuation piston 70 in FIGS. 17 to 20. In order to avoid or reduce an excess pressure within the cylinder housing 68 in the event of pressure actuation on that side of the actuation piston 70 which lies opposite the working space 71, the/each cylinder housing 68 has in this region (at least) one ventilation port 67 which is preferably covered on the outside by a dirt seal 69 resembling a diaphragm valve and taking the form of a toroidal tape (see, in particular, FIG. 16).

It is advantageous, furthermore, if the two cylinder housings 68 of the actuation device 66 are combined to form a one-piece molding. This cylinder molding is preferably screwed to the housing molding 28 in the region of the lateral assembly extensions 75, specifically with the one-part cover element 50 being interposed. Then, according to FIG. 21, the latter has matching assembly extensions 75 with screw holes 76. For positioning and as an assembly aid, positioning extensions 77, which engage into matching orifices, are provided preferably in the bearing region between the actuation device 66 and the cover element 50 and between the latter and the housing 18 or the housing molding 28 (see, in particular, FIG. 16). By means of a different arrangement and/or shape, for example different diameters, of the positioning extensions 77, the parts can be connected to one another only correctly and in the right position, so that faulty assembly is advantageously virtually ruled out.

Figure 6:
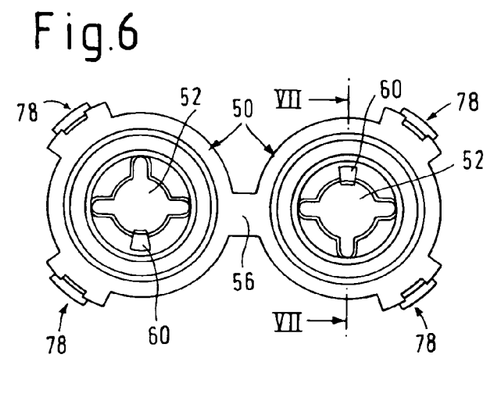
FIG. 6 shows an enlarged view of a cover element in the direction of the arrow VI according to FIG. 7.
Figure 7:
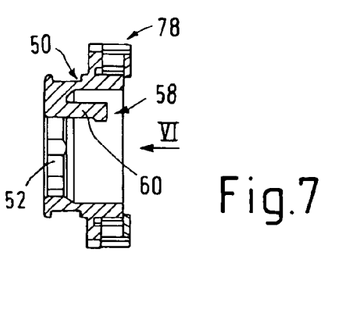
FIG. 7 shows a section in the plane VII-VII in FIG. 6.

In the alternative according to FIGS. 2 to 13, according to FIG. 6 the cover element 50 can be latched with the valve housings 18 or with the housing molding 28 via latching means 78. In this case, the actuation device 66 may also be fastened via latching means (not illustrated).

Figure 22:
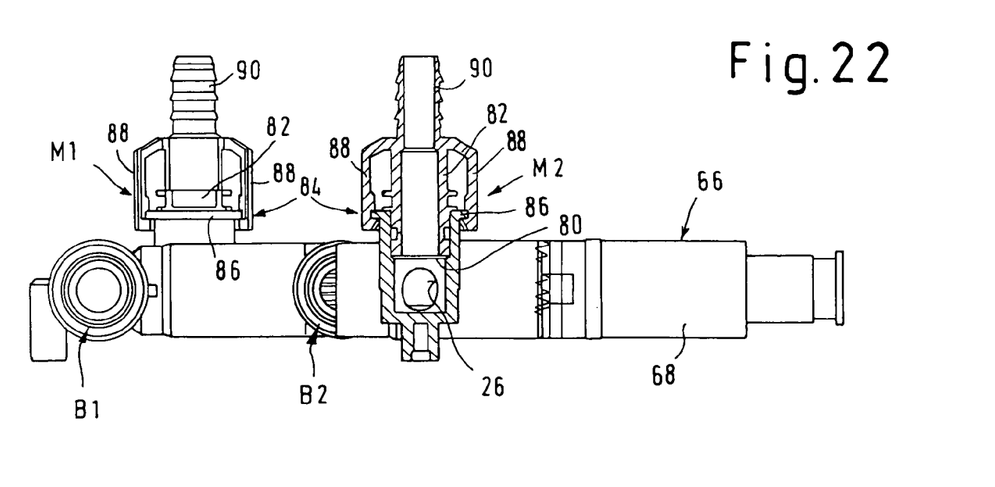
FIG. 22 shows a part section through the valve arrangement along the sectional line XII-XII in FIG. 15 with an additional illustration of connecting plugs.

It is expedient, furthermore, if all the connections A1, A2, B1, B2, M1, M2 and S1 and S2 provided are designed as coupling parts for the, in particular, directionally variable plug connection of lines. Reference is made, in this respect, to FIG. 22, according to which each connection is designed as a socket-like reception orifice 80 for plugging in a plug part 82. In this case, moreover, suitable locking means 84 for releasable locking of the plug-in plug part 82 are provided. In the example illustrated, each connection has, in the region of issue of the reception orifice 80, a radially outward-projecting circumferential edge 86, over which, in the plugged-in state, outer axially extending latching arms 88 of the respective plug part 82 are engaged in a latching manner. For release, the latching arms 88 can be spread radially outward. The advantage of this type of connection is that the direction of run on the connected line (itself not illustrated) is variable, because the plug part 82 can be rotated relative to the connections. In the example illustrated according to FIG. 22, each plug part 82 has a conventional connecting dowel 90 for the line connection.

The components of the valve arrangement 1 according to the invention, specifically, in particular, the valve housings 18 or the one-piece housing molding 28, the slides 24 and preferably also the cover elements 50 and, optionally, the cylinder housings 68 and the actuation pistons 70, preferably consist of the same material, specifically, in particular, of a fiber-reinforced plastic, such as PA12-GF50. This preferred material has low water absorption and is highly suitable for use with fuels, in particular diesel. Leaks, which could arise due to thermal expansion, are avoided, using identical materials for the components.

For assembly fastening to a carrier, not illustrated, in a motor vehicle, the housing molding 28 has at least two, preferably three fastening elements 92 which are integrally formed on the outside and, in particular, are arranged so as to be offset axially and/or radially with respect to the regions of the sealing faces 34, in such a way that, during assembly, a distortion of the molding and dimensional variations resulting from this in the region of the sealing faces 34 are largely ruled out. This ensures good functioning capacity and a permanent sealing action in the region of the circumferential seals 32 and sealing faces 34.

Figure 10:
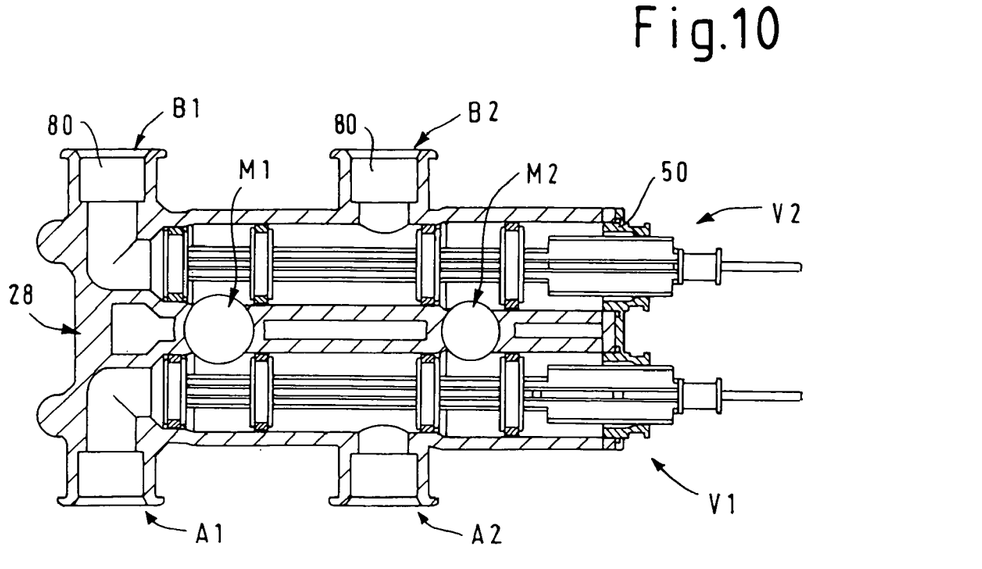
Figure 11:
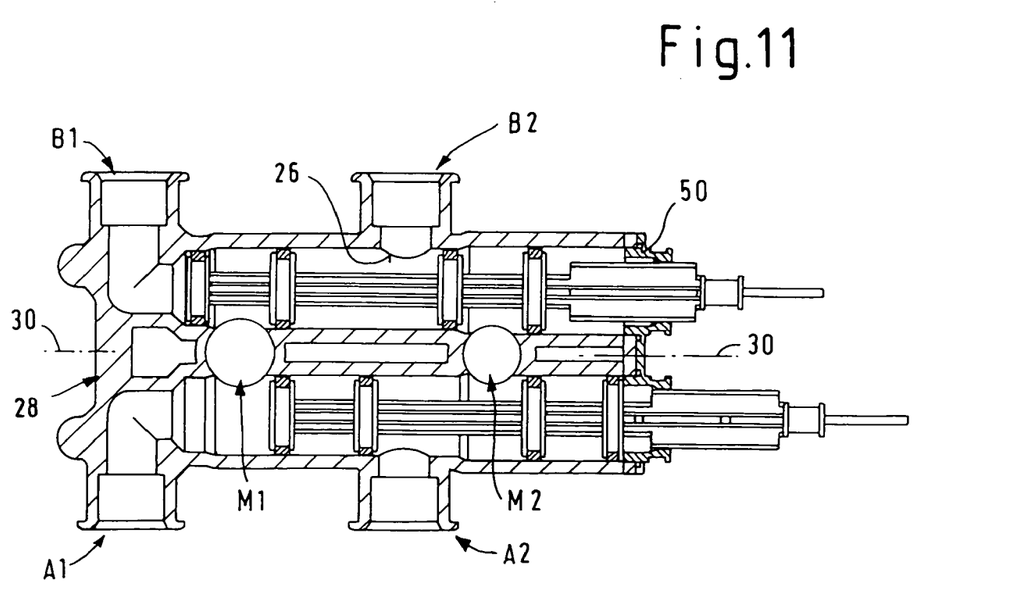
Figure 12:
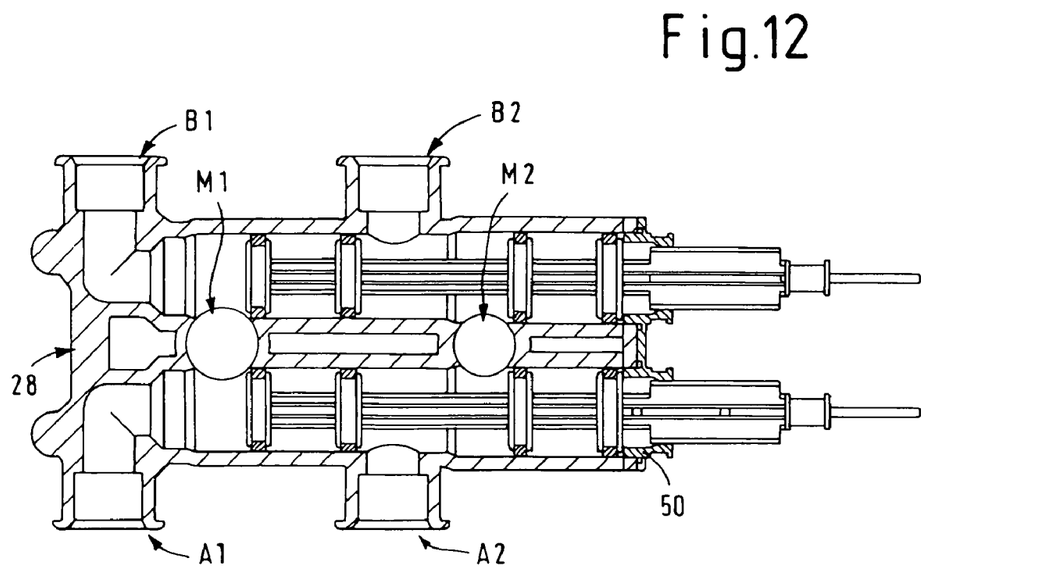
Figure 13:
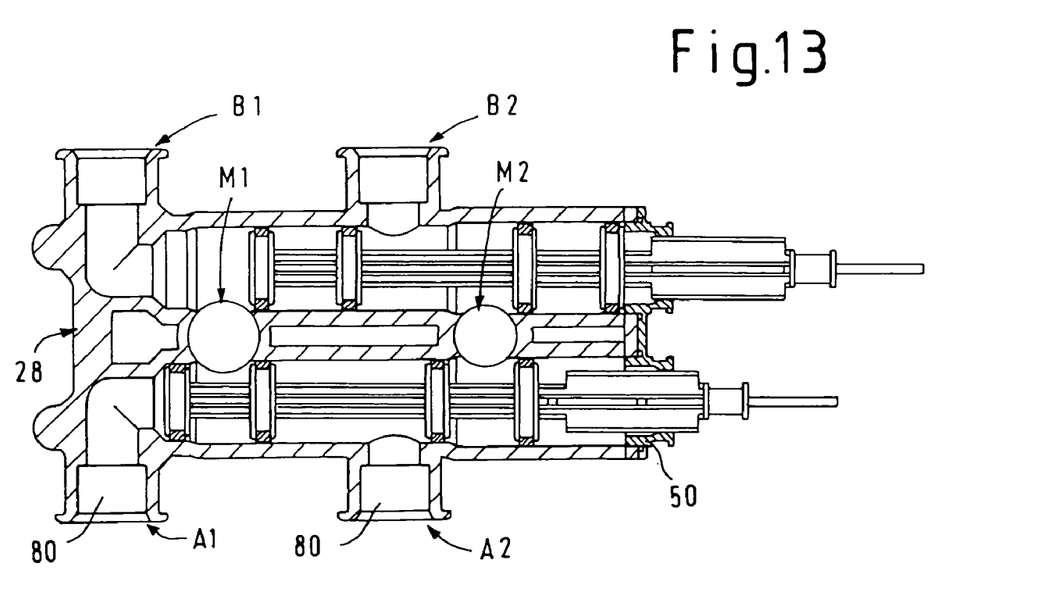

The function of the valve arrangement 1 according to the invention would already seem to be sufficiently clear from the above explanations of this construction. Reference is additionally made to the illustrations in FIGS. 10 to 13. FIG. 10 illustrates an optional shut-off position, in which all existing connections are separated from one another. FIG. 11 shows the valve position for connecting the tank A to the engine M, in that A1 is connected to M1 and A2 to M2. The tank B shut off from the engine M. The opposite switching position is illustrated in FIG. 13, the tank A being shut off and the tank B being connected to the engine M. Finally, FIG. 12 shows the position in which both tanks A and B are connected to the engine M. This switching position is provided with the situation where both tanks are filled with the same fuel.

The shut-off position according to FIG. 10 may be provided as a test position for leaktightness testing. In this case, in the valve, two test chambers are formed, which can be acted upon with a test pressure by the two engine connections M1 and M2. These test chambers are sealed by the circumferential seals 32 of the slides 24. In the event of a measured pressure drop of the test pressure, a damaged or even absent circumferential seal can be inferred.

As a result of the described configuration of the valve arrangement 1 or of the two slide valves 14, 16, the forward flow and return flow of a tank are only ever switched jointly. Misplaced transpositions are thereby ruled out.

It may be noted, once again, that a slide valve 14 or 16 of the type described or a double slide valve of the preferred type may also be used, independently of the special application described as a tank changeover valve, as a general 4/2-way (i.e. four-way valve with two switching positions) or 6/3-way or 6/4-way valve.

Moreover, the invention is in any case not restricted to the exemplary embodiment described, but also extends to identically acting versions. Furthermore, the invention has also hitherto not yet been restricted to the feature combination defined in the respectively independent claim, but may also be defined by any other desired combination of specific features of all the individual features disclosed as a whole. This means that, in principle, virtually any individual feature of the respectively independent claim may be omitted or be replaced by at least one individual feature disclosed elsewhere in the application. To that extent, the claims are to be understood merely as a first attempt at the formulation of an invention.

The invention claimed is:

1. A multiway valve arrangement for use as a fuel tank changeover valve between at least two fuel tanks and an engine in a motor vehicle, comprising at least two pairs of tank connections, including at least two forward flow tank connections and at least two return flow tank connections, and two engine connections including a forward flow engine connection and a return flow engine connection, the valve arrangement further comprising at least two cooperating multiway slide valves, symmetrical in circuit terms, such that the forward flow tank connections can be connected alternatively or jointly to the forward flow engine connection, and the return flow tank connections to be connected alternatively or jointly to the return flow engine connection.

2. A valve arrangement according to claim 1, wherein there are two slide valves, and wherein the forward flow engine connections of both the valves are connected to one another to form a common forward flow engine connection, and the return flow engine connections of both the valves are connected to one another to form a common return flow engine connection.

3. A valve arrangement according to claim 1, wherein all the connections are designed as coupling parts for the plug connection of lines, with each connection being designed as a socket-like reception orifice for plugging in a plug part, and locking means for the releasable locking of the plug part being provided.

4. A valve arrangement according to claim 1, wherein there are two slide valves, and wherein each of the slide valves has a valve housing and a slide longitudinally displaceable in a piston-like manner between at least two switching positions in a cylinder-like slide space within the valve housing in the direction of a slide axis, each of the slide spaces having, at axially offset points, four control ports which are connected in each case to one of the tank connections or to one of the engine connections.

5. A valve arrangement according to claim 4, wherein the slide valves are arranged directly adjacently to one another and, with respect to the slide axes, are parallel to one another.

6. A valve arrangement according to claim 5, wherein the valve housings are designed mirror-symmetrically with respect to a central plane of symmetry, the tank connections extending outward from the housings and away from the plane of symmetry, and further wherein the engine connections are arranged centrally in a direction of run corresponding to the plane of symmetry.

7. A valve arrangement according to claim 6, wherein each engine connection has a duct which intersects the slide spaces of the two slide valves in order to form associated control ports.

8. A valve arrangement according to claim 4, wherein the valve housings of the slide valves are combined to form a monolithically molded one-piece housing.

9. A valve arrangement according to claim 8, wherein the molding is produced as a plastic injection molding or as a metal diecasting.

10. A valve arrangement according to claim 4, wherein each of the slides has a plurality of circumferential seals which are spaced apart axially and which cooperate with inner sealing faces of the respective valve housing.

11. A valve arrangement according to claim 10, wherein each of the slides consists of a centric axial core and of a plurality of radial dish-like valve disks and an actuation end led outward on the valve housing on the one side, each of the valve disks, on their outer circumference, carrying one of the circumferential seals in an annular groove.

12. A valve arrangement according to claim 11, wherein the circumferential seals, with regard to their outside diameters, and the sealing faces, with regard to their inside diameters are dimensional to cooperate such that each circumferential seal, which, in the event of a switching action, moves axially over the region of one of the control ports, is unpressed radially in its range of movement extending axially over and beyond the control port and is pressed radially only in a sealing region lying in each case axially between two of the control ports.

13. A valve arrangement according to claim 12, wherein the slide space of each valve housing has, starting from an open end, a plurality of cylindrical or slightly conical sealing faces which merge one into the other axially via conical transitions and the inside diameters of which are reduced successively via the conical transitions.

14. A valve arrangement according to claim 10, wherein the valve housings or the housing molding has at least two fastening elements which are arranged outside the regions of the sealing faces, in such a way that distortion-related deformations in the region of the sealing faces are avoided during assembly of the valve arrangement.

15. A valve arrangement according to claim 4, wherein the valve housings have opened ends and can be closed at their open ends by means of a cover element, the cover element further serving for guiding an actuation end of the respective slide.

16. A valve arrangement according to claim 5, wherein the cover element has a guide orifice for a guide portion of the respective slide, said orifice defining a rotary position, and securing against rotation of the slides.

17. A valve arrangement according to claim 16 further comprising a plurality of positioning extensions in a connection region between the cover element and the valve housing said plurality of positioning extensions engaging with a plurality of matching orifices such that only correct assembly is possible.

18. A valve arrangement according to claim 4, wherein each slide is fixed in each of two switching positions with a frictional form fit, via latching means.

19. A valve arrangement according to claim 4, further comprising a concertina-like sheath being arranged, for sealing off against dirt, between an actuation end of each slide and the valve housing or a cover element connected to the valve housing.

20. A valve arrangement according to claim 4, further comprising an actuation device, assigned to an actuation end of the slide, for the manual or motive actuation of the slide, wherein said motive actuation is accomplished by pneumatic actuation, hydraulic actuation, or electromagnetic actuation.

21. A valve arrangement according to claim 20, wherein the valve housings are connectable on the side of actuation ends of the slide to a cylinder housing and the slide actuation ends are connectable to an actuation piston, and further wherein each of the cylinder houses has a control pressure connection communicating to a working space for the action of pressure upon the actuation piston.

22. A valve arrangement according to claim 21, wherein each cylinder housing has, on a side of the actuation piston which lies opposite the working space, at least one ventilation port equipped with a valve-like dirt seal.

23. A valve arrangement according to claim 4, wherein the valve housings or the one-piece molding and the slides are both comprised of a fiber-reinforced plastic.

24. A valve arrangement according to claim 1, further comprising a valve housing and a slide for at least one of the multiway valves which is longitudinally displaceable in a piston-like manner between at least two switching positions in a cylinder-like slide space within a valve housing in the direction of a slide axis, and which has circumferential seals which are spaced apart axially and cooperate with inner sealing faces of the slide space, in order either to connect in pairs or to shut off relative to one another control ports communicating with the slide space, wherein the circumferential seals, with regard to their outside diameters, and the sealing faces, with regard to their inside diameters, are dimensional to cooperate such that each circumferential seal, in the event of a switching action, moves axially over and beyond one of the control ports, is unpressed radially in its range of movement extending over and beyond the control port, and is pressed radially only in a sealing region lying in each case axially between two of the control ports.

25. A valve arrangement according to claim 24, wherein the slide space of the valve housing is structured as a one-piece molding and has, starting from an open end, a plurality of cylindrical or slightly conical sealing faces which merge one into the other axially via conical transitions, the inside diameters of the sealing faces being reduced successively via the conical transitions.

26. A valve arrangement according to claim 24, wherein there are two slide valves arranged directly adjacent to one another and, with respect to their slide axes, parallel to one another.

27. A valve arrangement according to claim 26, wherein the two valve housings of the slide valves are combined to form a monolithically one-piece plastic injection molding or a metal diecasting.

28. A valve arrangement according to claim 26, wherein the valve housings are designed mirror-symmetrically with respect to a central plane of symmetry, further wherein the two separate sets of forward flow tank connections and return flow tank connections extend outward from the housings and away from the plane of symmetry, and further wherein the forward flow engine connection and the return flow engine connection are arranged centrally and extend coincident with the plane of symmetry.

* * * * *

UNITED STATES PATENT AND TRADEMARK OFFICE
CERTIFICATE OF CORRECTION

| | | |
|---|---|---|
| PATENT NO. | : 7,367,352 B2 | Page 1 of 1 |
| APPLICATION NO. | : 11/232046 | |
| DATED | : May 6, 2008 | |
| INVENTOR(S) | : Harald Hagen, Markus Hasberg and Andreas Suhr | |

It is certified that error appears in the above-identified patent and that said Letters Patent is hereby corrected as shown below:

In claim 16, column 10, line 21, after "claim" delete "5" and insert -- 15 --.

Signed and Sealed this

Fourteenth Day of October, 2008

JON W. DUDAS
*Director of the United States Patent and Trademark Office*